(12) United States Patent
Hammons, Jr. et al.

(10) Patent No.: US 6,209,116 B1
(45) Date of Patent: Mar. 27, 2001

(54) ADAPTABLE OVERLAYS FOR FORWARD ERROR CORRECTION SCHEMES BASED ON TRELLIS CODES

(75) Inventors: A. Roger Hammons, Jr., North Potomac; Ernest Yeh, Gaithersburg, both of MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/169,350

(22) Filed: Oct. 9, 1998

Related U.S. Application Data

(60) Provisional application No. 60/061,437, filed on Oct. 9, 1997.

(51) Int. Cl.[7] .................................................. H03M 13/35
(52) U.S. Cl. ........................................... 714/786; 714/792
(58) Field of Search .................................. 714/786, 792, 714/795

(56) References Cited

U.S. PATENT DOCUMENTS

| | | | | |
|---|---|---|---|---|
| 5,214,656 | * | 5/1993 | Chung et al. ........................ | 371/43 |
| 5,305,352 | * | 4/1994 | Calderbank et al. .................. | 375/39 |
| 5,377,194 | * | 12/1994 | Calderbank ........................ | 370/110.1 |
| 5,671,156 | * | 9/1997 | Weerackody et al. ........... | 364/514 R |
| 5,691,995 | * | 11/1997 | Ikeda et al. ............................. | 371/43 |
| 5,757,821 | * | 5/1998 | Jamal et al. ........................... | 371/30 |
| 5,812,601 | * | 9/1998 | Schramm ............................. | 375/262 |
| 5,903,546 | * | 5/1999 | Ikeda et al. .......................... | 370/232 |
| 5,970,098 | * | 10/1999 | Herzberg .............................. | 375/264 |

* cited by examiner

Primary Examiner—Stephen M. Baker
(74) Attorney, Agent, or Firm—John T. Whelan; Michael W. Sales

(57) ABSTRACT

A method and apparatus for providing auxiliary data in a idle potion of a slot in a time division multiple access system is disclosed. A speech coder converts speech into digital signals that are coupled to a convolutional coder. The convolutional coder processes the digital signals using three or four connection polynomials to create two sets of outputs. One set of outputs, which is generated from first and second connection polynomials is identical to the standard output of a IS-136 convolutional coder. The second set of outputs, which are the auxiliary data, are generated using third and fourth connection polynomials. The second set of outputs is coupled to a puncturing function, which appropriately deletes portions of the second set of outputs. The remaining portion of the second set of outputs is transmitted in the idle portion of a time slot.

29 Claims, 5 Drawing Sheets

Unequal Protection
Class 1a - Protected by CRC and Convolutional Code
Class 1b - Protected by Convolutional Code
Class 2 - Unprotected

ADAPTABLE OVERLAYS FOR FORWARD ERROR CORRECTION SCHEMES BASED ON TRELLIS CODES

RELATED APPLICATIONS

This application is based on and claims benefit from a provisional application entitled "Adaptable Overlays For Forward Error Correction Schemes Based on Trellis Codes" which was filed on Oct. 9, 1997, and respectively accorded Ser. No. 60/061,437.

BACKGROUND OF THE INVENTION (a) Field of the Invention

The present invention relates generally to communication systems and, more particularly to an adaptable redundancy scheme, or overlay, for use in communication systems that use forward error correction (FEC) schemes.

(b) Description of Related Art

Many digital cellular systems break time into a number of slots and transmit information in each time slot. For example, a cellular system may break time into six slots, with a different subscriber unit assigned to communicate with a cellular base station during each one of the time slots. The cellular base station communicates with a first user during a first time slot, a second user during a second time slot, and so on for each time slot. After communication is made on the last time slot, the cycle is repeated and communication is made on the first time slot. However, not all of the time slots are completely filled with digital communication signals and, therefore, valuable communication time is wasted. This cellular communications configuration, where time is multiplexed between numerous users, is typically referred to as a time division multiple access (TDMA) system. TDMA systems typically use some form of Forward Error Correction (FEC) to minimize the number of communication errors in a system, thereby, improving the quality of the system.

Standard IS-136 is the current digital cellular standard used for TDMA systems. FIG. 1 is a diagram showing the FEC scheme for an IS-136 TDMA digital cellular system, which uses trellis coding. The IS-136 system includes a speech coder 50 coupled to an IS-136 FEC coder 51, which includes a 7-bit Cyclic Redundency Check (CRC) computation function 52, a rate ½ convolutional coder 54, a puncturing function 56, a voice cipher 58, and a 2-slot interleaver 60. The speech coder 50 processes analog voice signals into digital data or bits. The IS-136 FEC scheme uses unequal protection of the speech coder 50 output bits to reduce communication errors. Bits from the speech coder 50 are classified into three distinct categories. The speech coder 50 outputs 48 class Ia bits, which are passed to both the CRC computation function 52 and the rate ½ convolutional coder 54. Although a speech coder 50 is disclosed, any digital data source may be used. The class Ia bits, which are the 48 most perceptually significant bits in terms of voice quality, are protected by a 7-bit CRC, which is generated by the CRC computation function 52, and the rate ½ conditional code. The speech coder 50 also outputs 48 class Ib outputs, which are passed to, and protected by, the rate ½ convolutional coder 54. Additionally, the speech coder 50 produces 52 class II bits that are not protected in any way. The class II bits are perceptually the least significant bits used in the system.

The class Ia bits, class Ib bits, the 7-bit CRC, and 5 tail bits, which are used to terminate a trellis, are processed by the rate ½ convolutional coder 54. As will be appreciated by one skilled in the art, a trellis code is a digital communication coding scheme. The rate ½ convolutional coder 54 produces 216 encoded bits from the 108 bit input. The output of the rate ½ convolutional coder 54 is coupled to a puncturing function 56, which punctures (deletes) 8 bits, thereby creating a 208 bit output. The output of the puncturing function 56 and the 52 class II output from the speech coder 50 are coupled to a voice cipher 58. The voice cipher 58 performs data encryption on the 260 bits to create 260 encoded bits. The output of the voice cipher 58 is coupled to the 2-slot interleaver 60, which reorders the encoded bits of two slots in order to randomize any burst errors that the channel may produce as seen by the channel decoder. In order to meet system usage and quality of service requirements, there will often be idle time slots where no data communications take place.

Due to advances in technology and other market factors, there is a movement in the digital cellular industry to modify standard IS-136 in order to make use of any idle time slot period. The proposed modification to IS-136 is known generally as the ADVICE system. The ADVICE system allows a cellular base station to transmit auxiliary information (bits) in idle time slot periods. The auxiliary coded information will be redundant information that assists certain subscriber units in accurately receiving communications sent from a cellular base station, thereby, resulting in higher voice quality at the subscriber unit.

Although the ADVICE system proposes utilizing unused time slots to transmit auxiliary information, the ADVICE system does not specify any manner in which the auxiliary information is to be generated. Digital communication systems such as cellular systems typically use trellis coding, a process by which each bit that is input into an encoder results in the transmission of multiple coded bits. Trellis coding is typically implemented using convolutional codes or multiple trellis coded modulation codes. Rate-compatible families of such codes are well known for their suitability in adaptive FEC and automatic repeat request (ARQ) protocols.

Currently, multiple rate codes are typically generated by puncturing a base code. Puncturing a code consists of removing selected coded bits from the transmission stream. For example, a rate ¼ encoder generates four coded bits for each data bit that is to be broadcast. If a certain number of coded bits are deleted, the effective rate of the code becomes higher than ¼. When a communication channel is unfavorable, all coded bits from the base code are transmitted. However, as the channel quality improves, fewer of the encoded bits are transmitted, thereby raising the effective rate of the code. That is, as the channel improves, the puncture rate increases.

One approach to providing the auxiliary information to subscriber units is through traditional concatenated coding schemes. Concatenated coding schemes typically use a high rate BCH or Reed-Solomon codes as an outer code. However, the use of this approach in the ADVICE system would increase subscriber unit complexity because each subscriber unit would require a BCH/Reed-Solomon decoder, which the subscriber units do not presently have, as it is not part of the current IS-136 standard. Additionally, performance issues with concatenated coding include a lack of optimal maximum likelihood decoders and the severe nature of Rayleigh fading channels, which is typical of mobile cellular systems. The implementation of a concatenated coding scheme would require significant changes to the IS-136 coding scheme, thereby adversely affecting backward compatibility. Because the IS-136 standard is used by so many communication systems, it is necessary that the implementation of the ADVICE system maintain backward compatibility with current cellular communication systems.

Accordingly, there is a need for a method of generating and selecting auxiliary data bits to be sent during idle time slot periods in the ADVICE communication system. It is necessary that the ADVICE system maintain backward compatibility with current IS-136 systems, while not requiring additional complexity in the subscriber unit.

SUMMARY OF THE INVENTION

The present invention is embodied in a method of generating and transmitting auxiliary digital information in a communication system. The method includes the steps of identifying digital data for transmission, applying a plurality of connection polynomials to the digital data to generate a standard set of convolutionally coded data and an auxiliary set of convolutionally coded data, puncturing the standard set of convolutionally coded data to create a standard set of punctured data, and puncturing the auxiliary set of convolutionally coded data to create an auxiliary set of punctured data. The method also includes the steps of broadcasting the standard set of punctured data in a first transmission slot and broadcasting the auxiliary set of punctured data in a second transmission slot, wherein the second transmission slot is in known relationship with the first transmission slot in time.

The present invention may also be embodied in an apparatus for generating and transmitting auxiliary coded digital information in a communication system. The apparatus includes a digital signal source for providing digital signals, a convolutional coder connected to the digital signal source, wherein the convolutional coder processes the digital signals to produce a standard set of coded signals and an auxiliary set of coded signal, wherein the standard set of coded signals is created from a first connection polynomial and a second connection polynomial and the auxiliary set of coded signals is created from a third connection polynomial and a fourth connection polynomial, and a transmission control function connected to the convolutional coder for determining whether to transmit the auxiliary set of coded signals.

In another embodiment, the present invention is a method of decoding digitally-encoded data that are received on a plurality of time slots. This embodiment includes the steps of collecting data from the plurality of time slots, calculating path metrics relevant to a first class of data in a first section of a decoder trellis, splitting the first section of the decoder trellis into a second section of a decoder trellis and a third section of a decoder trellis, and updating the second section of the decoder trellis with the path metrics. The present invention also includes the steps of updating the third section of the decoder trellis with the path metrics, identifying a first maximum likelihood path corresponding to the second section of the decoder trellis and a second maximum likelihood path corresponding to the third section of the decoder trellis, both the first maximum likelihood path and the second likelihood path traversing the first section of the decoder trellis, and identifying a set of decoded data bits from the first maximum likelihood path and the second maximum likelihood path, wherein the bits associated with the first maximum likelihood path pertain to a first class of data and the bits associated with the second maximum likelihood path pertain to a second class of data and the bits pertaining to a third class of data are associated with one of the first maximum likelihood path and the second maximum likelihood path.

The invention itself, together with further objects and attendant advantages, will best be understood by reference to the following detailed description, taken in conjunction with the accompanying drawings.

DESCRIPTION OF THE PREFERRED EMBODIMENTS

As previously described, a cellular base station using the ADVICE system is capable of making auxiliary bits available to a particular subscriber unit in an idle time slot, which is also called an ADVICE slot. Due to timing and other cellular system requirements, it has been determined that a given subscriber unit in an IS-136 system has access to up to 100 auxiliary bits in an idle neighboring timeslot. It has also been determined that up to a full timeslot may be available for auxiliary bits in the DTX mode of operation of the IS-136+ system. Accordingly, the FEC overlay of the present invention is capable of functioning with either full or partial idle time slots having arbitrary pairings.

Figure 1:
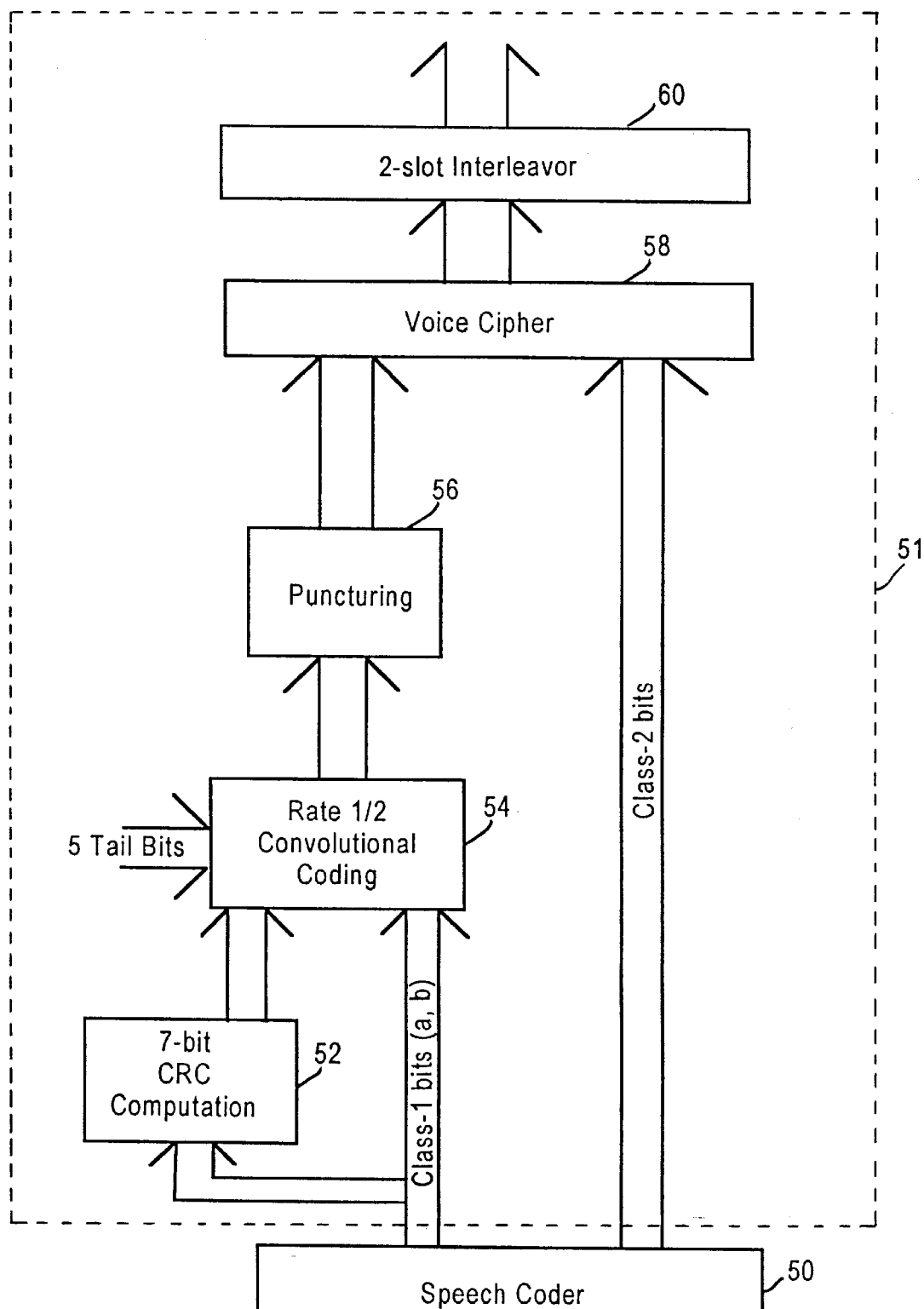
FIG. 1 is a functional block diagram of the forward error correction (FEC) function of an IS-136 TDMA cellular system.
Figure 2:
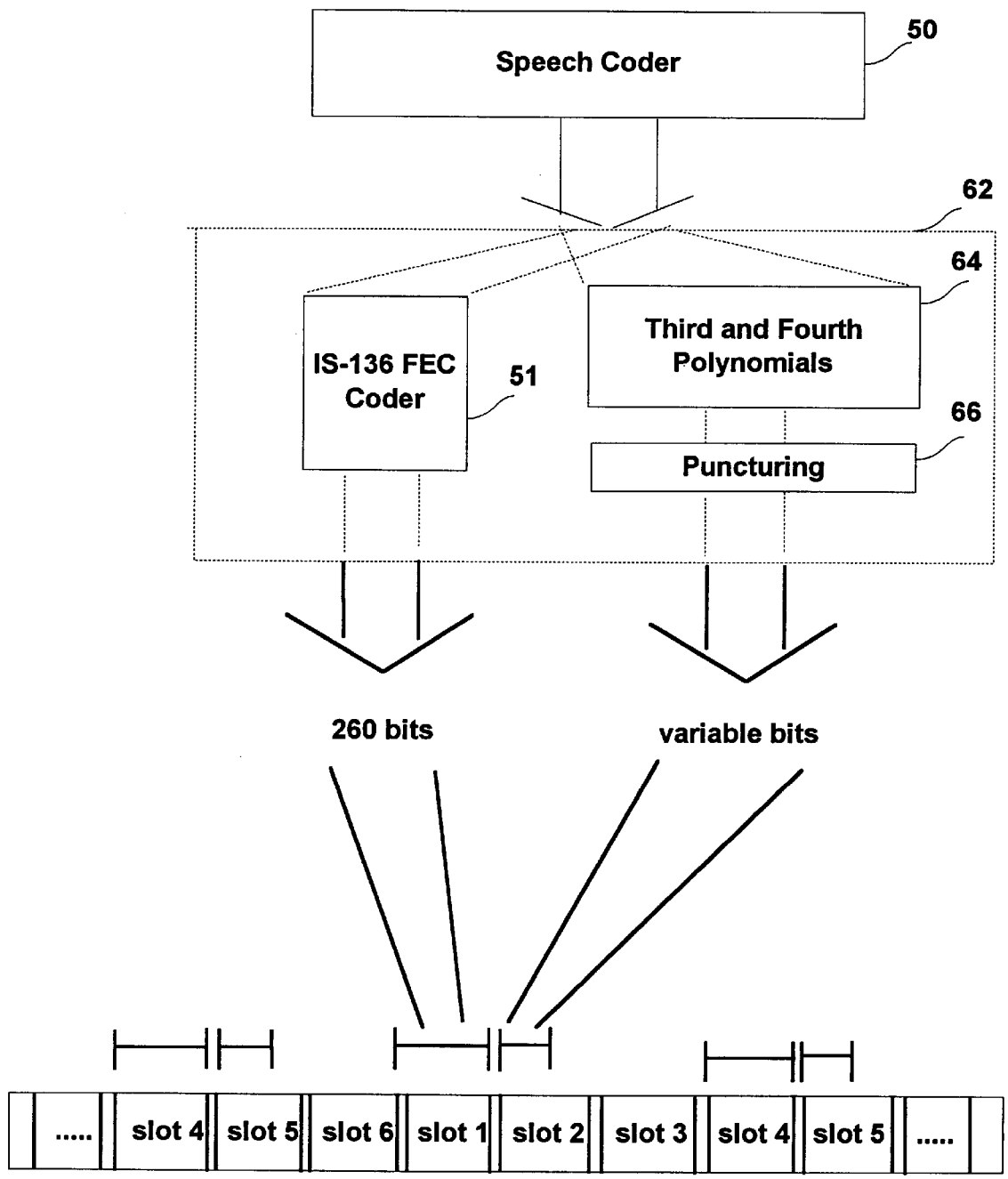
FIG. 2 is an illustration of how the FEC overlay of the present invention would interface with the ADVICE system and IS-136 TDMA time slot structures.

In accordance with present invention, auxiliary bits must be generated to fill the available ADVICE slots. FIG. 2 is an illustration of the ADVICE system using the FEC system in accordance with the present invention. The output of the speech coder 50 is coupled to an ADVICE FEC coder 62, which includes an IS-136 FEC coder 51, a third and fourth polynomial generator 64, and a puncturing function 66. The 260 bits generated by the IS-136 FEC coder 51 are used to fill a timeslot (e.g., slot 1). This operation is identical to the operation specified by the IS-136 protocol and described in conjunction with FIG. 1. In accordance with the present invention, the third and fourth polynomial generator 64 outputs third and fourth polynomials based on the output of the speech coder 50. The third and fourth polynomial data are passed to the puncturing function 66, which punctures, or deletes, the appropriate number of bits from the polynomial data. The output of the puncturing function 66 is a variable number of auxiliary bits that are used to fill an idle portion of an adjacent time slot (e.g., slot 2).

Figure 3:
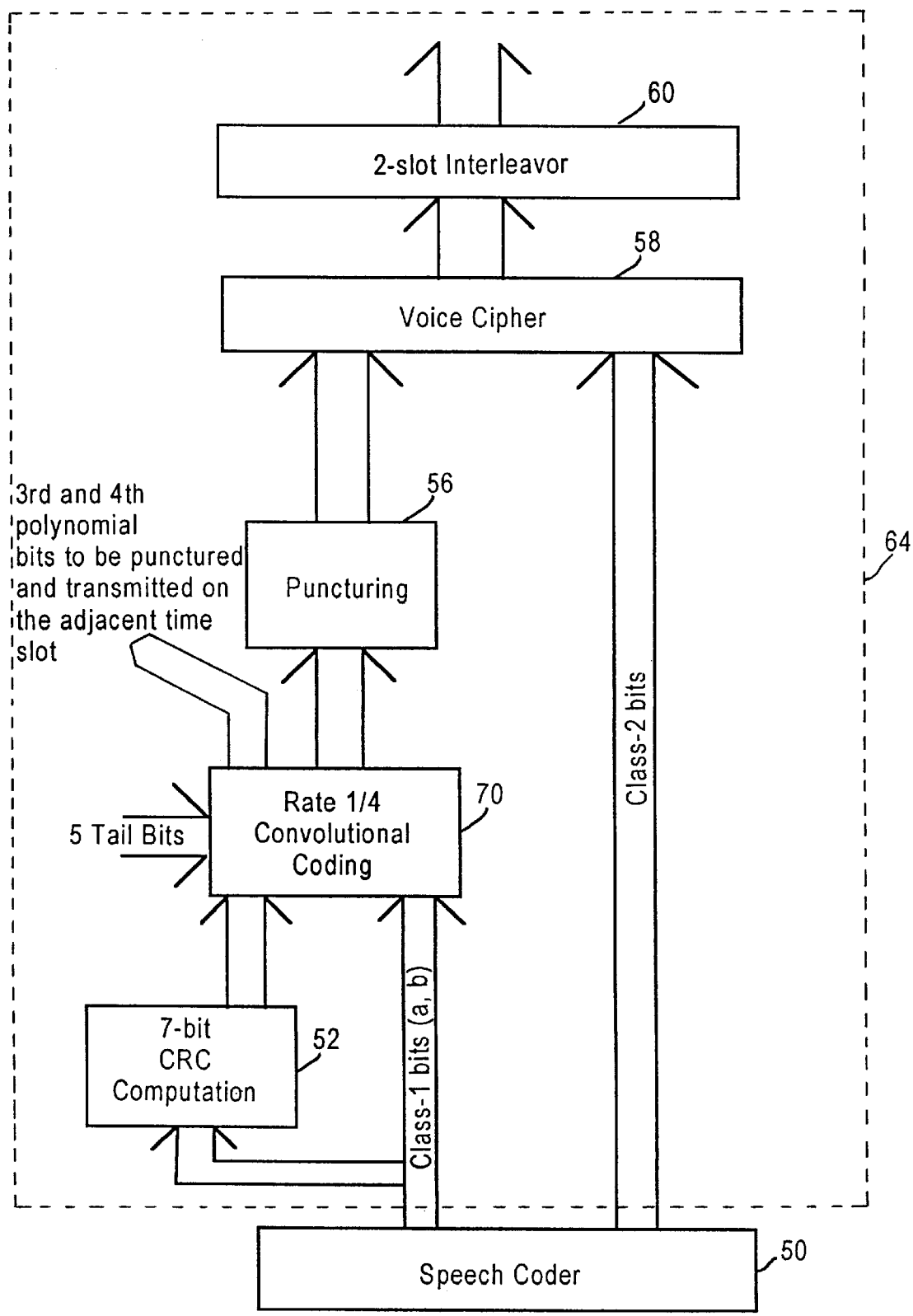
FIG. 3 is a detailed functional block diagram of the FEC overlay proposed for the ADVICE system.

FIG. 3 is an illustration of an ADVICE FEC coder 64 designed in accordance with the teachings of the present invention. The configuration shown in FIG. 3 is identical to the configuration of the conventional IS-136 system shown in FIG. 1, except that the rate ½ convolutional coder 54 is replaced with a rate ¼ convolutional coder 70. The ADVICE FEC coder may also include a transmission control function (not shown) that is connected to the convolutional coder for determining whether to transmit the auxiliary set of coded signals. In accordance with the present invention, the auxiliary bits that are needed to fill the idle time slots are generated using a lower rate convolutional code than is used in the IS-136 system. The rate of the convolutional code may be either ⅓ or ¼, depending on how much of the ADVICE slot can be utilized. If only 100 bits are available in an ADVICE slot, then rate ⅓ coding suffices. If a full slot can be used, then rate ¼ coding is desirable. The auxiliary bits are generated by additional connection polynomials, which are added to the IS-136 rate ½ convolutional coder 54. The connection polynomials used by the rate ½ convolutional encoder 54 in the IS-136 system are the optimal constraint length K=6, which is known to those skilled in art. The polynomials shown in equations 1 and 2 represent optimal K=6, rate ½ connection polynomials.

$$g_0(x)=x^5+x^4+x^2+1 \quad \text{(Equation 1)}$$

$$g_1(x)=x^5+x^3+x^2+x+1 \quad \text{(Equation 2)}$$

In accordance with the present invention, three or four connection polynomials are used to create a rate ⅓ or a rate ¼ coder. Since much less time than a full slot may be available, a rate ⅓ code is created by using three connection polynomials. As is known to those skilled in the art, equations 3–5 show optimal K=6, rate ⅓ covolutional code polynomials.

$$g_0(x)=x^5+x^3+x+1 \quad \text{(Equation 3)}$$

$$g_1(x)=x^5+x^4+x^3+x^2+1 \quad \text{(Equation 4)}$$

$$g_2(x)=x^5+x^2+x+1 \quad \text{(Equation 5)}$$

Equations three and four are the reverse polynomials of equations one and two, which are used to generate the rate ½ code. As is known by those skilled in the art, reverse polynomials generate codes that have the same error event weight distributions. Therefore, since equations one and two are optimal polynomials for rate ½ implementation, a third polynomial, which is the reverse of equation 5, can be added to the standard IS-136 polynomials shown in equations one and two. The resulting polynomials for use in the ADVICE FEC system are shown in equations 6–8.

$$g_0(x)=x^5+x^4+x^2+1 \quad \text{(Equation 6)}$$

$$g_1(x)=x^5+x^3+x^2+x+1 \quad \text{(Equation 7)}$$

$$g_2(x)=x^5+x^4+x^3+1 \quad \text{(Equation 8)}$$

Additionally, a rate ¼ code may be created by adding equation 9 to equations 6–8 to create a set of four connection polynomials.

$$g_3(x)=x^5+x^4+x^3+x+1 \quad \text{(Equation 9)}$$

To keep the auxiliary coded bits equal to the usable payload of the ADVICE time slot, the third polynomial shown in equation 8 is only applied to selected input bits for which protection is desired. Essentially, the lower rate code is punctured in the third and fourth coordinates. The puncturing on the first two coordinates remains the same as specified by the IS-136 specification.

Referring again to FIG. 3, the system of the present invention is shown. The rate ¼ convolutional coder 70 uses polynomials shown in equations 6 and 7 to generate the 216 bits that are coupled to the puncturing function 56. However, in accordance with the present invention, the polynomials shown in equations 8 and 9 are used to generate an auxiliary 216 bits that are punctured as necessary and transmitted in idle ADVICE slot.

The puncturing pattern of the 216 auxiliary bits can be chosen to protect any subset of the speech coder 50 output bits, including the currently unprotected class II bits. The more class II bits that are included as input to the rate ¼ coder 70, the heavier the puncturing rate of the ⅓ code will be.

Figure 4:
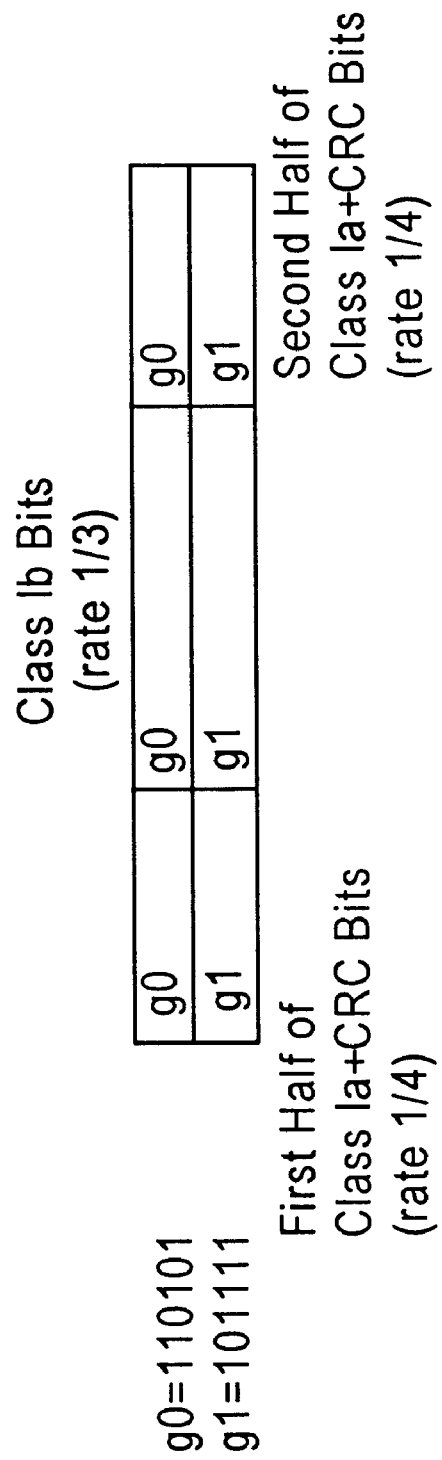
FIG. 4 is a functional representation of a FEC overlay for a system having no ADVICE slot.

FIG. 4 is a functional representation of an FEC overlay for a system having no ADVICE slots. An example of such a system is shown in FIG. 1. Such systems encode the class Ia and CRC bits with a rate ¼ convolutional code and encode class Ib bits with a rate ⅓ convolutional code. While the class I bits are encoded, the class II bits are not encoded and, therefore, do not appear in FIG. 4. The system represented by FIG. 4 uses connection polynomials $g_0(x)$ and $g_1(x)$ to encode the first half of the class Ia and CRC bits and then uses $g_0(x)$ and $g_1(x)$ to encode the class Ib bits. Finally, the function uses $g_0(x)$ and $g_1(x)$ to encode the second half the class Ia and CRC bits, thereby protecting the class I bits and not protecting the class II bits.

Figure 5:
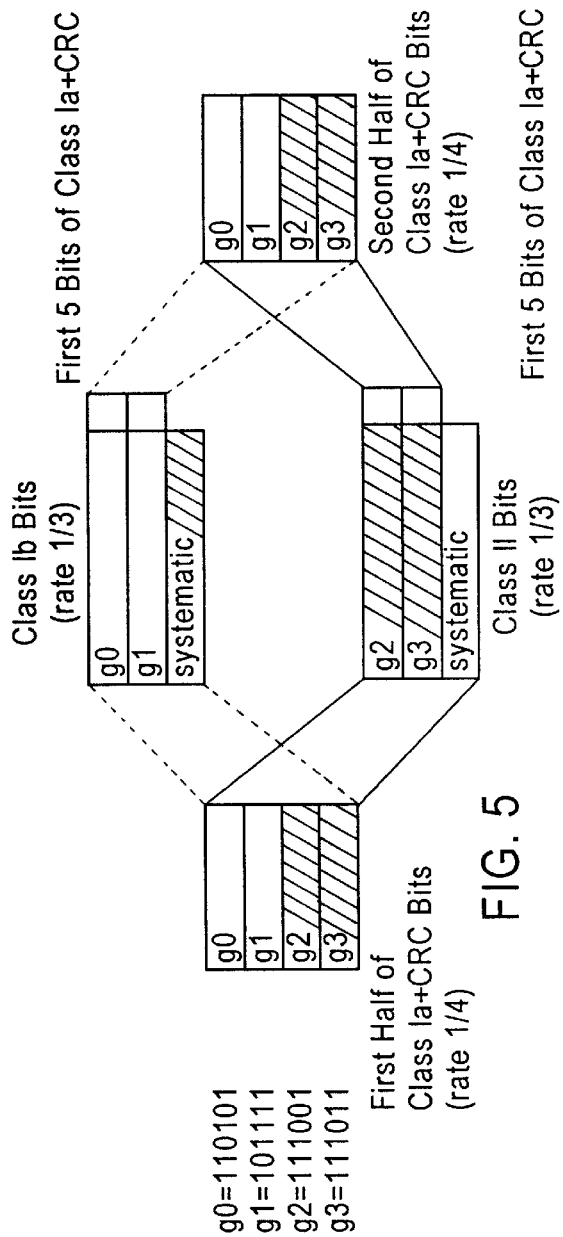
FIG. 5 is a functional representation of an FEC overlay for an ADVICE system, wherein auxiliary bits are filled into a full-slot and class II bits are protected by coding on the ADVICE slot.

When a full time slot is available for the auxiliary bits, it is possible to repeat the original coded bits in the ADVICE slot. The use of a full time slot is a significant performance improvement over the use of a smaller time slot. Further performance improvement is possible by providing additional coding on the currently unprotected class II bits. A scheme for providing protection of the class II bits on the ADVICE slot is shown in FIG. 5. As shown in FIG. 5, class II bits are substituted for class Ib bits and the class Ia and the class II bits are re-encoded for transmission on the same slot. The class Ib bits are sent uncoded on the ADVICE slot, which is shown crosshatched. In this scheme, the Class Ia and CRC bits receive protection by a rate ¼ nonsystematic conditional code. The encoded bits are sent across both the normal and ADVICE time slots. The Class Ib and Class II bits receive protection from a rate ⅓ systematic convolutional code. The encoded bits are sent across both time slots in such a way that the normal slot is conformant with the IS-136 FEC specifications for backward compatibility.

A Viterbi decoder receives the bits transmitted by the ADVICE system. Ideally, the normal and ADVICE data are received from both transmissions and used to decode the transmitted bits. For the scheme shown in FIG. 5, processing requires separate Viterbi decoding steps for the class Ib bits and the class II bits. FIG. 5 shows that the decoding of the normal and ADVICE transmissions can be done in an optimal semi-joint method in which common trellis sections are used in the processing of the Class Ia and CRC bits. The decoder trellis splits into separate parallel trellises after processing the first half of the Class Ia and CRC bits. One of the parallel trellis sections processes the data associated with the Class Ib bits; the other processes the data for the Class II bits. The separate trellises remerge to process the second half of the Class Ia and CRC bits. In FIG. 5, the Class Ib and Class II bits are encoded using different systematic rate ⅓ convolutional codes. The first five of the second half of the Class Ia and CRC bits are used by each separate parallel trellis section in order to merge them to the same state for subsequent combined processing.

Figure 6:
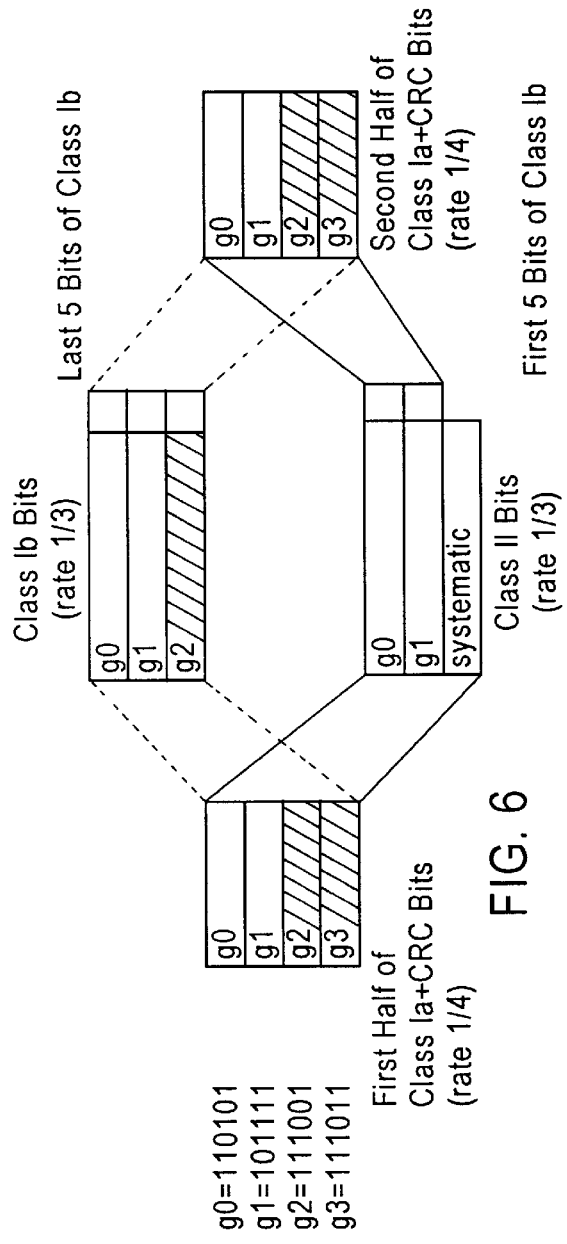
FIG. 6 is a functional representation of an improvement over the basic FEC overlay of FIG. 5.

An improvement of the basic scheme of FIG. 5 is shown in FIG. 6. The modifications involve using a nonsystematic rate ⅓ code for the Class Ib bits using polynomials $g_0(x)$, $g_1(x)$ and $g_2(x)$ and a systematic rate ⅓ convolutional code using polynomials $g_0(x)$ and $g_1(x)$ for the Class II bits. To optimally decode and then combine received data for the merging of the two parallel trellis sections, the last five Class Ib bits are used in both encodings to ensure that the coder state is the same for both transmissions.

A conventional Viterbi decoder using a rate ½ code ideally computes branch metrics according to equation 10.

$$\mu(\lambda; b) = \sum_{i=1}^{2} |r_i(t_{\lambda,i}) - \alpha_i(t_{\lambda,i})s_i(b)|^2 \quad \text{(Equation 10)}$$

Where:

$\mu(\lambda;b)$ denotes the branch metric for branch b at trellis stage $\lambda$;

$(r_1(t), r_2(t))$ denotes the received signals at time t corresponding to the transmitted code bits;

$(s_1(b)s_2(b))$ denotes the ideal modulated signals corresponding to the coded bits for branch b;

$\alpha_i(t)$ denotes the channel fade coefficient at time t; and $t_{\lambda,i}$ denotes the transmission time associated with the $i^{th}$ coded bit at the trellis stage $\lambda$.

Note that sampling times $t_{\lambda,i}$ are not necessarily uniformly spaced from one trellis stage to the next, or from one coded bit to the next, due to interleaving.

In accordance with the present invention, equation 11 denotes the ideal branch metrics for the augmented rate ⅓ code.

$$\mu(\lambda; b) = \sum_{i=1}^{3} |r_i(t_{\lambda,i}) - \alpha_i(t_{\lambda,i})s_i(b)|^2 \quad \text{(Equation 11)}$$

The rest of the Viterbi decoder remains the same, which results in only a modest increase in the decoder complexity of each subscriber unit.

Of course, it should be understood that a range of changes and modifications can be made to the preferred embodiment described above. For example, there are many well known simplifications of the Viterbi branch metric that can be performed to reduce implementation complexity of the present invention. Accordingly, the branch metric shown in equation 11 is merely illustrative. In the event of puncturing, the decoder sets $r_i(t)$ to a neutral value favoring neither the 0-bit value or the 1-bit value. For binary phase shift keying (BPSK) or quadrature phase shift keying (QPSK), $r_i(t)$ is set to zero. The channel fade coefficient is usually not known in the receiver. Accordingly, the receiver may form an estimate of the fade coefficient and use the estimate in the branch metric calculations or may ignore the fade coefficient all together. These and other variations of Viterbi decoding, including enhancements such as Soft Output Viterbi Algorithm (SOVA) and list-based Viterbi decoding, apply equally well to the present invention.

Additionally, the present invention is flexible with respect to the actual number of auxiliary bits available to the receiver. Given appropriate signaling between the base station and the subscriber unit, the number of auxiliary bits available to a subscriber unit can be dynamic. For example, the ADVICE system could allocate 25 bits of an available slot to one subscriber unit and a subsequent 25 bits to another subscriber unit. Furthermore, although the foregoing explanation is given with respect to audio or voice, the present invention may be utilized in any application in need of unequal error protection of data (e.g., video). It is therefore intended that the foregoing detailed description be regarded as illustrative rather than limiting and that it be understood that it is the following claims, including all equivalents, which are intended to define the scope of this invention.

What is claimed is:

1. A method of generating and transmitting auxiliary digital information in a communication system, comprising the steps of:
   identifying digital data for transmission;
   applying a plurality of connection polynomials to the digital data to generate a standard set of convolutionally coded data and an auxiliary set of convolutionally coded data;
   puncturing the standard set of convolutionally coded data to create a standard set of punctured data;
   puncturing the auxiliary set of convolutionally coded data to create an auxiliary set of punctured data;
   broadcasting the standard set of punctured data in a first transmission slot; and
   broadcasting the auxiliary set of punctured data in a second transmission slot, wherein the second transmission slot is in known relationship with the first transmission slot in time.

2. The method of claim 1, wherein the step of puncturing the auxiliary set of convolutionally coded data comprises determining an amount of information that can be transmitted in the second transmission slot.

3. The method of claim 1, wherein the second transmission slot comprises a variable size.

4. The method of claim 1, wherein the second transmission slot and the first transmission slot are of identical size.

5. The method of claim 1, wherein the second transmission slot can accommodate approximately 100 bits.

6. The method of claim 1, wherein the method is used in conjunction with a cellular communication system.

7. The method of claim 1, wherein the digital data for transmission includes an input bit stream that produces common input bits at known positions in the standard set of convolutionally coded data and in the auxiliary set of convolutionally coded data.

8. The method of claim 7, wherein the number of common input bits is at least equal to a maximum memory of a function performing the convolutional encoding.

9. The method of claim 7, wherein the common input bits comprise class Ia+CRC bits.

10. The method of claim 7, wherein the common input bits comprise class Ib bits.

11. An apparatus for generating and transmitting auxiliary coded digital information in a communication system, comprising:
   a digital signal source for providing digital signals;
   a convolutional coder connected to the digital signal source, wherein the convolutional coder processes the digital signals to produce a standard set of coded signals and an auxiliary set of coded signals, wherein the standard set of coded signals is created from a first connection polynomial and a second connection polynomial and the auxiliary set of coded signals is created from a third connection polynomial and a fourth connection polynomial;
   a transmission control function connected to the convolutional coder for determining whether to transmit the auxiliary set of coded signals; and
   a puncturing function in communication with the convolutional coder, wherein the auxiliary set of coded signals are coupled to the puncturing function.

12. The apparatus of claim 11, wherein the puncturing function deletes portions of the auxiliary set of coded signals.

13. The apparatus of claim 11, wherein the digital signals generated by the digital signal source comprise class I bits and class II bits.

14. The apparatus of claim 13, wherein the auxiliary set of coded signals is used to protect the class II bits.

15. The apparatus of claim 11, wherein the apparatus is used in conjunction with a cellular communication system.

16. The apparatus of claim 15, wherein the operation of the cellular communication system is based on an IS-136 standard.

17. A method of decoding digitally-encoded data that are received on a plurality of time slots, comprising the steps of:

collecting data from the plurality of time slots;

calculating path metrics relevant to a first class of data in a first section of a decoder trellis;

splitting the first section of the decoder trellis into a second section of a decoder trellis and a third section of a decoder trellis;

updating the second section of the decoder trellis with the path metrics;

updating the third section of the decoder trellis with the path metrics;

identifying a first maximum likelihood path corresponding to the second section of the decoder trellis and a second maximum likelihood path corresponding to the third section of the decoder trellis, both the first maximum likelihood path and the second likelihood path traversing the first section of the decoder trellis;

identifying a set of decoded data bits from the first maximum likelihood path and the second maximum likelihood path, wherein the bits associated with the first maximum likelihood path pertain to a first class of data and the bits associated with the second maximum likelihood path pertain to a second class of data and the bits pertaining to a third class of data are associated with one of the first maximum likelihood path and the second maximum likelihood path.

18. The method of claim 17, wherein the path metrics are Viterbi decoder path metrics.

19. The method of claim 17, wherein the first class of data comprises a portion of moderately significant data.

20. The method of claim 17, wherein the second class of data comprises a portion of least significant data.

21. The method of claim 17, wherein the third class of data comprises a portion of the most significant data.

22. The method of claim 17, further comprising the steps of:

merging the second section of the decoder trellis and the third section of the decoder trellis into a common fourth section of a decoder trellis;

updating the fourth section of the decoder trellis with path metrics obtained from the second section of the decoder trellis and the third section of the decoder trellis, wherein the updates to the fourth section of the decoder trellis pertains to a fourth class of data;

identifying continuations of the first maximum likelihood path and the second maximum likelihood path through the fourth section of the decoder trellis; and identifying decoded data bits for the fourth class of data from one of the first maximum likelihood path and the second maximum likelihood path.

23. An apparatus for generating and transmitting auxiliary coded digital information in a communication system, comprising:

a digital signal source for providing digital signals;

a convolutional coder connected to the digital signal source, wherein the convolutional coder processes the digital signals to produce a standard set of coded signals and an auxiliary set of coded signals, wherein the standard set of coded signals is created from a first connection polynomial and a second connection polynomial and the auxiliary set of coded signals is created from a third connection polynomial and a fourth connection polynomial;

a transmitter, adapted to broadcast the standard set of coded signals in a first transmission slot and the auxiliary set of coded signals in a second transmission slot; and a transmission control function, coupled to the convolutional coder and adapted to determine whether to transmit the auxiliary set of coded signals.

24. The apparatus of claim 23, wherein the digital signals generated by the digital signal source comprise class I bits and class II bits.

25. The apparatus of claim 24, wherein the auxiliary set of coded signals are adapted to protect the class II bits from encoding.

26. The apparatus of claim 23, further comprising a puncturing function in communication with the convolutional coder, wherein the auxiliary set of coded signals are coupled to the puncturing function.

27. The apparatus of claim 26, wherein the puncturing function deletes portions of the auxiliary set of coded signals.

28. The apparatus of claim 23, wherein the apparatus is used in conjunction with a cellular communication system.

29. The apparatus of claim 28, wherein the operation of the cellular communication system is based on an IS-136 standard.

* * * * *